S. SECKENDORF.
LOCK FOR MOTOR VEHICLES.
APPLICATION FILED MAY 29, 1915.
1,151,830.
Patented Aug. 31, 1915.
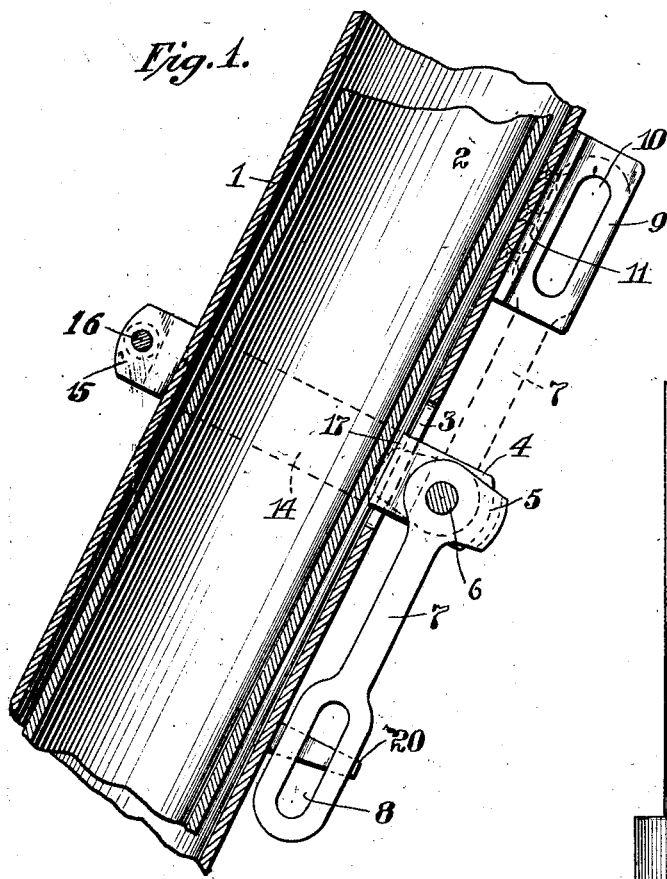
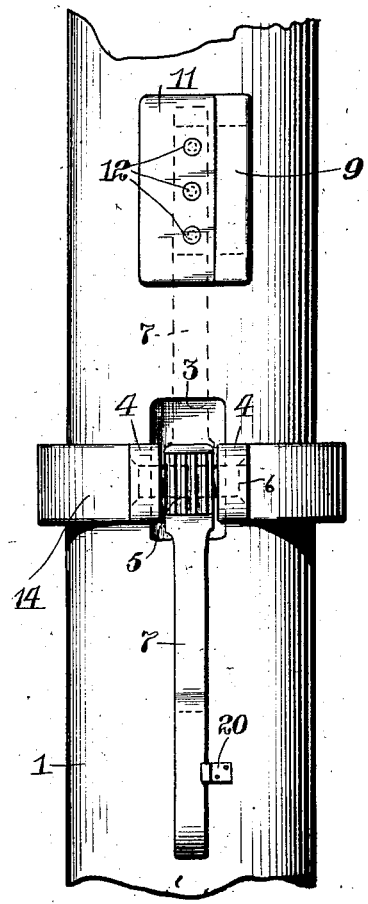
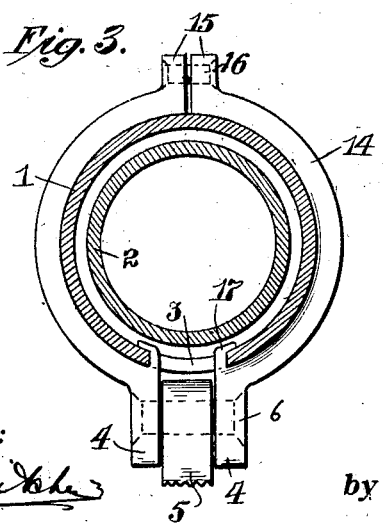
Attest:
Inventor:
S. Seckendorf.
by Oscar F. Gunz Atty.

UNITED STATES PATENT OFFICE.

SAMUEL SECKENDORF, OF NEW YORK, N. Y.

LOCK FOR MOTOR-VEHICLES.

1,151,830.  Specification of Letters Patent.  Patented Aug. 31, 1915.

Application filed May 29, 1915. Serial No. 31,094.

*To all whom it may concern:*

Be it known that I, SAMUEL SECKENDORF, a citizen of the United States, and a resident of New York city, borough of Manhattan, in the county of New York and State of New York, have invented certain new and useful Improvements in Locks for Motor-Vehicles, of which the following is a specification.

The object of my invention is to provide a new and improved lock for motor vehicles to prevent purloining of the same, by locking the steering head post or other steering device in such manner that the steering wheel or wheels form an angle to the longitudinal axis of the body so as to make it impossible to trail, push, run or otherwise propel the vehicle on a straight line in the street, which locking device is simple in construction, strong and durable and can be attached to any steering head.

In the accompanying drawings in which like letters of reference indicate like parts in all the figures: Figure 1 is a longitudinal sectional view through the steering head showing my locking device in the unlocked position in full lines and in the locked position in dotted lines. Fig. 2 is an elevation with the parts in the same positions. Fig. 3 is a sectional plan view of the same.

The fixed steering post 1 surrounds the usual steering tube 2 which is turned axially in steering by means of a hand wheel or the like. The outer tube 1 is provided with a longitudinal slot 3 and at each side of the same with a lug 4, between which lugs a clamping jaw 5 is pivoted by means of a pivot 6, one end of which clamping jaw 5 is shaped as a cam edge and preferably formed of a series of longitudinal grooves to engage the inner tube 2. The clamping jaw 5 is formed on one end of a lever 7 which is widened at its free end and provided with a longitudinal slot 8. When the lever 7 extends downward, the clamping jaw or cam 5 is withdrawn from the slot 3 and thereby not in engagement with the tube 2. When the lever is turned 180 degrees so as to project upward, the clamping jaw is passed through the slot and engages the inner tube 2. If desired the inner tube may be provided with a longitudinal groove in its outer surface for the purpose of receiving the segmental clamping edge of the jaw 5. When the lever 7 is raised, its upper end is adjacent to a keeper 9 which is provided with a longitudinal slot 10 which registers with the slot 8 of the lever and then a hasp of a lock of any kind can be passed through two slots and the lever locked in raised position with the clamping jaw engaged with the inner tube. It will be impossible to turn the inner tube 2 when the parts are in this position, that is to say it will be impossible to turn the steering gear of the vehicle for the purpose of steering the vehicle.

The locking jaw is applied in the manner described when the steering wheels are at a greater or less angle to the longitudinal axis so that if an attempt is made to push, or pull the vehicle, it will describe a circle of greater or less radius and practically make it impossible to drag, push or pull it away.

The keeper 9 is provided with a flange 11 which is fastened by screws 12 to the outer tube 1. When the locking lever 7 is raised and held in place by the lock passed through its slot and the slot of the keeper, the lever 7 rests upon the screws and thus makes it impossible for the keeper to be detached from the outer tube. The jaws or lugs 4 are formed on the outer side of two half rings 14 which at the opposite ends are provided with ears 15 through which a rivet 16 is passed. The half rings 14 are provided with an inwardly extending hook projection 17 at the inner ends of the jaws 4. To apply these half rings, the hook projections 17 are inserted through the slot 3 and then moved laterally so that the hook projections engage the edges of the slots and then the rivet 16 is passed through the lugs 15 and upset. It will therefore be impossible for persons who wish to remove the vehicle surreptitiously to remove the jaws 4, which they could do if they were merely attached by screws and furthermore the hook lugs 17 give the cam lever a good firm bearing on the outer tube and prevent the half rings on which they are held from being bent outward under the strain of the clamping jaw 5.

When a person leaves the vehicle, he need only swing up the locking lever 7 and lock it in raised position by means of a lock as aforesaid, and the automobile then cannot be surreptitiously removed for the reasons above stated, as the steering wheels are locked at a greater or less angle to the longitudinal axis of the vehicle and the vehicle can only move in a curved line. When the owner returns to the automobile, he can easily open the lock, swing down the lever 7 and the steering tube can then be turned freely in any direction. The cam or locking jaw is entirely withdrawn from the interior of the outer tube when the lever is swung down and there is absolutely no danger whatever of accidentally engaging and locking the inner tube as such locking can only take place when the lever is swung up and the locking jaw projects beyond the inner surface of the outer tube. If desired a spring clamp 20 may be provided on the steering post to hold the lever 7 against movement, due to vibration of the car when said lever is not used for locking purposes.

Having described my invention what I claim as new and desire to secure by Letters Patent is:—

1. The combination with an automobile steering post and steering tube in the same, of a locking lever for the steering tube pivoted on the post, a keeper against which the lever rests when in locking position, screws passed through the flange of the keeper into the post, which screws are covered by the locking lever when the same is in locking position, substantially as set forth.

2. The combination with an automobile steering tube and steering post, the latter being provided with a longitudinal slot, of two half rings applied on the steering post, each having outwardly projecting lugs at each end, one of said lugs on each half ring being adjacent to the sides of the slot, a rivet passed through the opposite lug, a locking lever for engagement with the steering post pivoted between the lugs adjacent to the slot and inwardly extending hook lugs which are passed through the slot to engage the inner wall of the steering post, substantially as set forth.

3. The combination with an automobile steering tube and steering post, the latter being provided with longitudinal slots, of two half rings applied on the steering post, each having outwardly projecting lugs at each end, one of said lugs on each half ring being adjacent to the sides of the slot, a rivet passed through the opposite lug, a locking lever for engagement with the steering post pivoted between the lugs adjacent to the slot and members on said half rings projecting through the slot to the interior of the steering post, substantially as set forth.

Signed at New York city, borough of Manhattan, in the county of New York and State of New York this 24th day of May A. D. 1915.

SAMUEL SECKENDORF.

Witnesses:
ALBERT D. KUBIE,
OSCAR F. GUNZ.